(12) United States Patent
Nikolina et al.

(10) Patent No.: US 11,600,128 B2
(45) Date of Patent: Mar. 7, 2023

(54) SYSTEM AND METHOD OF CASTING A VOTE IN AN ELECTRONIC BALLOTING SYSTEM

(71) Applicant: AO Kaspersky Lab, Moscow (RU)

(72) Inventors: Alexandra M. Nikolina, Moscow (RU); Alexander S. Korunov, Moscow (RU); Alexander V. Sazonov, Moscow (RU); Ochir V. Abushinov, Moscow (RU); Zoya S. Sergeeva, Moscow (RU)

(73) Assignee: AO Kaspersky Lab, Moscow (RU)

( * ) Notice: Subject to any disclaimer, the term of this patent is extended or adjusted under 35 U.S.C. 154(b) by 278 days.

(21) Appl. No.: 16/880,520

(22) Filed: May 21, 2020

(65) Prior Publication Data
US 2021/0097796 A1    Apr. 1, 2021

(30) Foreign Application Priority Data
Sep. 30, 2019 (RU) ............................ RU2019130598

(51) Int. Cl.
*G07C 13/00* (2006.01)
*G06F 21/32* (2013.01)

(52) U.S. Cl.
CPC ............. *G07C 13/00* (2013.01); *G06F 21/32* (2013.01); *G06Q 2230/00* (2013.01)

(58) Field of Classification Search
None
See application file for complete search history.

(56) References Cited

U.S. PATENT DOCUMENTS

| | | | |
|---|---|---|---|
| 7,640,181 B2* | 12/2009 | McClure | G07C 13/00 705/12 |
| 11,100,743 B1* | 8/2021 | Sealy | G07C 13/00 |
| 2002/0019767 A1* | 2/2002 | Babbitt | G07C 13/00 705/12 |
| 2003/0034393 A1 | 2/2003 | Chung | |
| 2003/0208395 A1* | 11/2003 | McClure | G07C 13/00 235/50 A |
| 2004/0024635 A1* | 2/2004 | McClure | G07C 13/00 705/12 |
| 2008/0172333 A1 | 7/2008 | Neff | |
| 2011/0040605 A1 | 2/2011 | Evertz | |
| 2013/0144686 A1 | 6/2013 | Hotto et al. | |

(Continued)

*Primary Examiner* — Phirin Sam
(74) *Attorney, Agent, or Firm* — ArentFox Schiff LLP; Michael Fainberg (57) ABSTRACT

Disclosed herein are systems and methods for casting a vote in an electronic balloting system. In one aspect, an exemplary method comprises, authenticating a voter from whom a request for casting a vote is received, when the voter is successfully authenticated, generating an electronic ballot based on voting information, gathering data about an electronic vote of the voter, the electronic vote representing a choice of the voter on the electronic ballot, generating and sending at least one request to the voter, the request being generated for confirmation of a validity of the gathered data on the electronic vote, generating a hardcopy of the ballot filled out by the voter and placing the generated hardcopy in a centralized repository, and counting the vote, when the hardcopy of the ballot is successfully generated and an affirmative response is received from the voter in response to the at least one request.

15 Claims, 3 Drawing Sheets

(56) References Cited

U.S. PATENT DOCUMENTS

| | | | |
|---|---|---|---|
| 2015/0310686 A1* | 10/2015 | Backert | G06F 21/36 |
| | | | 705/12 |
| 2018/0211467 A1* | 7/2018 | Babic | G07C 13/00 |
| 2018/0350180 A1* | 12/2018 | Onischuk | G07C 13/00 |
| 2019/0288846 A1* | 9/2019 | Zawierka | H04L 9/3239 |
| 2020/0027296 A1* | 1/2020 | Hoover | G07C 13/00 |
| 2020/0226866 A1* | 7/2020 | Heuman | G09C 1/00 |
| 2020/0242229 A1* | 7/2020 | Curran | G06F 21/606 |
| 2020/0258338 A1* | 8/2020 | Goswami | H04L 9/3247 |
| 2021/0166515 A1* | 6/2021 | Durham, III | H04L 9/3226 |

\* cited by examiner

SYSTEM AND METHOD OF CASTING A VOTE IN AN ELECTRONIC BALLOTING SYSTEM

CROSS REFERENCE TO RELATED APPLICATIONS

The present application claims priority to Russian Patent Application No. 2019130598, filed on Sep. 30, 2019, the entire content of which is incorporated herein by reference.

FIELD OF TECHNOLOGY

The present disclosure relates to the field of electronic balloting system, more specifically, to systems and method of casting a vote when using an electronic balloting system.

BACKGROUND

The widespread use of various computing devices (personal computers, notebooks, tablets, smartphones and so forth), the advent of accessible high-performance servers, the enormous increase in the bandwidth of computer networks and the substantial lowering of the price for network traffic for end users in recent years have given a powerful stimulus to the use of distributed data processing systems by individual users and entire organizations. When distributed data processing systems are utilized, data is produced on certain computing devices, processed on others, and stored on still other devices. At the same time, cloud services are increasingly gaining in popularity, during the use of which the personal computing devices of users are often times employed solely as terminals. For example, online banking systems, hotel room and travel ticket reservation systems, rating systems (systems for producing reviews, for example reviews of films) and so forth may be provided as such cloud services.

In one example, such distributed data processing systems include electronic balloting systems—systems in which a voter may vote for a candidate (during an election, for example) or make a rating review (such as one for a film they have seen, a book they have read, or an item they have purchased) with the aid of their computing device (personal computer, notebook, tablet, mobile telephone, and so forth). Some obvious advantages afforded by an electronic balloting system, include ease of voting (all that is needed is the voter's computer with specialized software preinstalled or an ordinary browser, if the electronic balloting service is publicly available, and also access to a computer network, such as the Internet), efficiency (the voter can vote at any time and from any place with access to the computer network), and vote counting accuracy (all votes are counted and kept in a central location, the counting is efficient and automatic, ruling out human error). In addition, electronic balloting systems are able to solve the problems of increasing the information security of voting (increasing the trust in a vote cast), reduce the risk of falsifications (decreasing violations during elections, such as forced early voting, ballot box stuffing, fake votes, deliberate vote counting mistakes, and so on) and increase the reliability of the voting results.

One can identify two main problems which an electronic balloting system should solve effectively:
voter anonymity (in other words, assuring secrecy of the voting process, so that during the entire voting process, in every stage thereof, from voter registration to the final vote count at the end of the voting, it would be impossible to determine who each voter has voted for); and
enhancing the information security of the votes cast by protecting the electronic balloting system against falsifications during the voting process.

Voter anonymity is provided by a technology which allows concealment of the identity of the voter and the choice made by the voter during all stages of the voting process.

Protection against falsification during elections is provided by a group of technologies which allow various kinds of falsifications to be counteracted. The falsification may include:
administrative pressure;
fake votes (such as ballot box stuffing when voting using paper ballots, replacing one vote by another, and so forth);
different kinds of multiple voting, or "merry-go-rounds" (methods of affecting the outcome of voting involving the bribing of the voter, e.g., by handing out an already filled-in ballot to the voter prior to entering the polling station, which the voter needs to cast in the ballot box, walking out with the new blank ballot which is handed over to the organizer of the "merry-go-round" in return for money or other financial benefits, where the blank ballot is then filled out and handed over to the next voter);
unlawful interference with the work of the election monitors at the polling stations;
faking of voting records (for example, knowingly entering false data in the final voting results);
deliberate ballot counting mistakes;
changing the voting results at those polling stations where a certain candidate has won or where the results at a polling station may significantly affect the general results of the election, preventing the "true" candidate from winning a victory;
and so forth.

At the present time, many technologies exist and are used in electronic balloting systems to solve some or all of the above described problems. However, these technologies do not meet the needs of information security (i.e., decreasing election irregularities) and are unable to deal with unauthorized modification of the results of electronic balloting.

Thus, there is a need for a more optimal way of guaranteeing the security of votes and providing an accurate count of the votes when using an electronic balloting system.

SUMMARY

Aspects of the disclosure relate to casting a vote when using an electronic balloting system, more specifically to systems and methods for increasing security of information when counting votes that are cast during a voting process. In one aspect, the information security is increased by using a two-factor confirmation of the vote casting.

In one exemplary aspect, a method is provided for counting votes in an electronic balloting system, the method comprising: by a vote counting system of the electronic balloting system, authenticating a voter from whom a request for casting a vote is received, when the voter is successfully authenticated, generating an electronic ballot based on voting information, gathering data about an electronic vote of the voter, the electronic vote representing a choice of the voter on the electronic ballot, generating and sending at least one request to the voter, the request being generated for confirmation of a validity of the gathered data on the electronic vote of the voter, generating a hardcopy of the ballot filled out by the voter and placing the generated hardcopy in a centralized repository, and counting the vote of the voter, when the hardcopy of the ballot is successfully generated and an affirmative response is received from the voter in response to the at least one request sent for confirmation of the validity of the gathered data.

In one aspect, the authentication of the voter is performed based on at least one of: biometric data of the voter, and an electronic digital signature of the voter, wherein the electronic digital signature of the voter is unique to the voter.

In one aspect, the sending of the request to the voter for the confirmation of the validity of the gathered data about the electronic vote of the voter is performed upon an expiration of a predetermined time interval from a time of registration of the electronic vote of the voter.

In one aspect, the sending of the request to the voter for the confirmation of the validity of the gathered data about the electronic vote of the voter is performed when a number of votes by registered voters is exceeded by a predetermined threshold value.

In one aspect, the hardcopy of the ballot filled out by the voter includes: a printed listing of items among which the voter is to select by casting a vote and an indication of the selected item.

In one aspect, the method further comprises: skipping the counting of the vote of the voter when the generation of the hardcopy of the ballot is unsuccessful or an affirmative response is not received from the voter in response to the at least one request sent for confirmation of the validity of the gathered data; and providing information regarding the uncounted vote to an election monitor.

In one aspect, the method further comprises at least one of: storing the counted votes of the voter in a decentralized registry of records; and storing the cast votes of the voter in a decentralized registry of records.

According to one aspect of the disclosure, a system is provided for counting votes in an electronic balloting system, the system comprising a hardware processor configured to: authenticate a voter from whom a request for casting a vote is received, when the voter is successfully authenticated, generate an electronic ballot based on voting information, gather data about an electronic vote of the voter, the electronic vote representing a choice of the voter on the electronic ballot, generate and send at least one request to the voter, the request being generated for confirmation of a validity of the gathered data on the electronic vote of the voter, generate a hardcopy of the ballot filled out by the voter and place the generated hardcopy in a centralized repository, and count the vote of the voter, when the hardcopy of the ballot is successfully generated and an affirmative response is received from the voter in response to the at least one request sent for confirmation of the validity of the gathered data.

In one exemplary aspect, a non-transitory computer-readable medium is provided storing a set of instructions thereon for counting votes in an electronic balloting system, wherein the set of instructions comprises instructions for: authenticating a voter from whom a request for casting a vote is received, when the voter is successfully authenticated, generating an electronic ballot based on voting information, gathering data about an electronic vote of the voter, the electronic vote representing a choice of the voter on the electronic ballot, generating and sending at least one request to the voter, the request being generated for confirmation of a validity of the gathered data on the electronic vote of the voter, generating a hardcopy of the ballot filled out by the voter and placing the generated hardcopy in a centralized repository, and counting the vote of the voter, when the hardcopy of the ballot is successfully generated and an affirmative response is received from the voter in response to the at least one request sent for confirmation of the validity of the gathered data.

The method and system of the present disclosure are designed to provide security for information during votes, counting of votes, reporting of votes, etc.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and a computer program for counting votes in an electronic balloting system. Those of ordinary skill in the art will realize that the following description is illustrative only and is not intended to be in any way limiting. Other aspects will readily suggest themselves to those skilled in the art having the benefit of the disclosure. Reference will now be made in detail to implementations of the example aspects as illustrated in the accompanying drawings. The same reference indicators will be used to the extent possible throughout the drawings and the following description to refer to the same or like items.

In one aspect, the present disclosure describes a system for counting votes in an electronic balloting that is implemented on a computing system (e.g., a computer of a means of transportation, etc.), that includes real-world devices, systems, components, and groups of components realized with the use of hardware such as integrated microcircuits (application-specific integrated circuits, ASICs) or field-programmable gate arrays (FPGAs) or, for example, in the form of a combination of software and hardware such as a microprocessor system and set of program instructions, and also on neurosynaptic chips. The functionality of such means of the system may be realized solely by hardware, and also in the form of a combination, where some of the functionality of the system means is realized by software, and some by hardware. In certain aspects, some or all of the components, systems, etc., may be executed on the processor of a general-purpose computer (such as the one shown in FIG. 3). Furthermore, the system components may be realized either within a single computing device or spread out among several interconnected computing devices.

Figure 1:
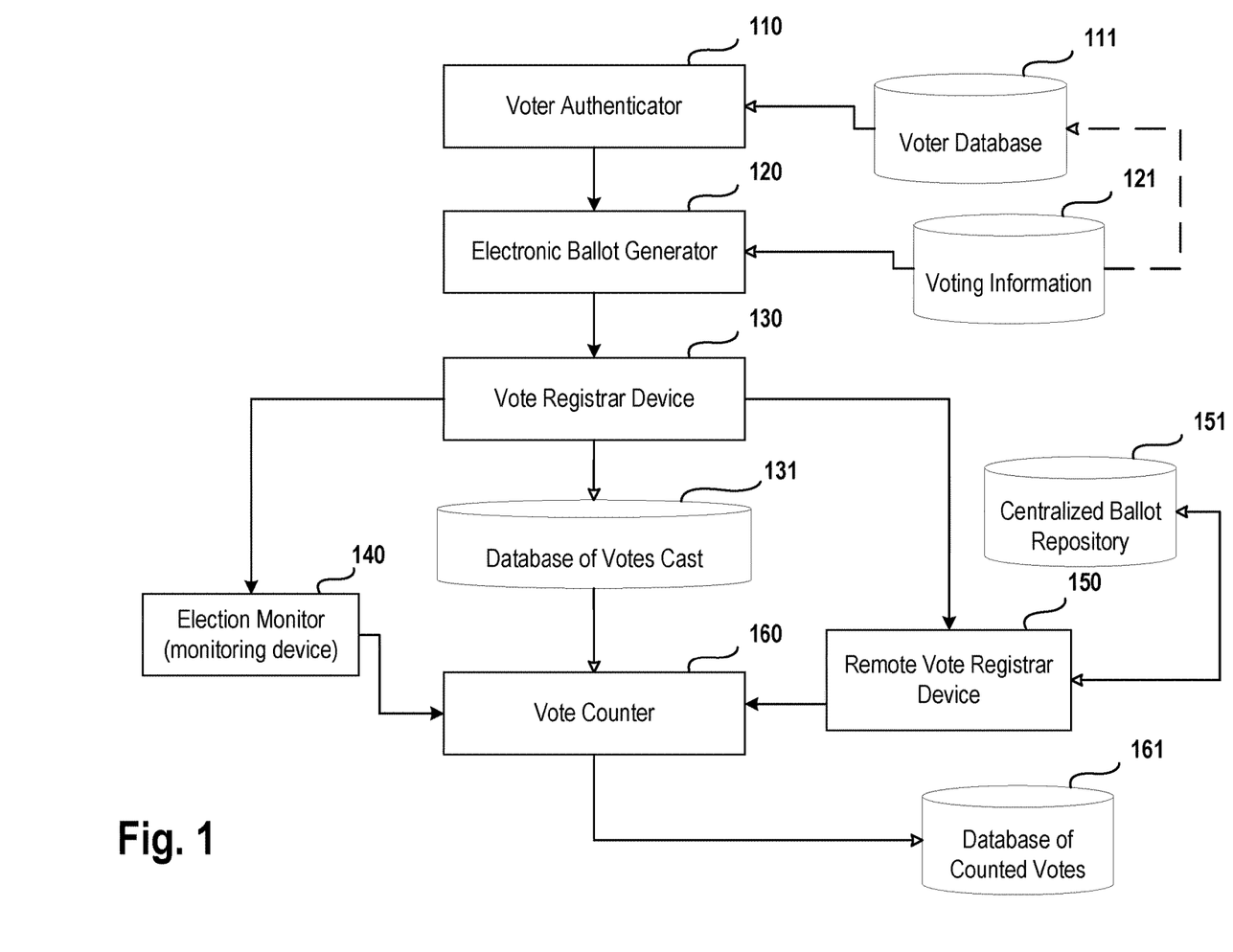
FIG. 1 illustrates a system for casting a vote in an electronic balloting system in accordance with aspects of the present disclosure.

FIG. 1 illustrates a system 100 for casting a vote in an electronic balloting system in accordance with aspects of the present disclosure. In one aspect, the system 100 comprises a voter authenticator 110, a voter database 111, an electronic ballot generator 120, voting information 121, a vote registrar device 130, a database of votes cast 131, an election monitor 140, a remote vote registrar device 150, a centralized ballot repository 151, a vote counter 160, and a database of counted votes 161. It is noted that the voter authenticator 110, electronic ballot generator 120, the vote registrar device 130, the election monitor 140, the remote vote registrar device 150, and the vote counter 160 comprise: one or more computing devices, components of computing devices, etc. That is, the voter authentication, ballot generation, registration of votes that are cast, election monitoring, and counting of votes cast, etc., are all performed via electronic devices using hardware, software, etc. and not by humans.

In one aspect, the voter authenticator 110 is designed to:
authenticate a voter who is intending to participate in the voting on the basis of data from the voter database 111; and
send the data on the voter to the electronic ballot generator 120, in the event of successful authentication of the voter.

In one aspect, the authentication of the voter is done based on at least one of the following methods:
biometric data of the voter; and
an electronic identifier of the voter.

For example, prior to the start of the voting (upon arrival at the polling station where corresponding computer equipment is installed for the electronic balloting) or upon registration in the service of an electronic balloting system the voter undergoes an authentication.

As a result of the authentication, the method: determines whether or not an individual (i.e., a person) is entitled to participate in any number of voting processes that are occurring; for an individual who is entitled to vote, determines the particular voting processes in which the individual is participating (if several voting processes are occurring at the same time); the options (choices) that may be presented to the individual, and so forth. The voter registration, described above, as well as the various actions and verifications needed to perform the voting, are carried out by a special supervisory body—e.g., an election commission.

In one aspect, the voting may be performed remotely without visiting a polling station If it is possible to vote remotely, the registration involves identification and authorization of the user as a voter, and also providing the user information and software needed to perform the voting. In one aspect, voting remotely is performed using individual computing devices such as personal computers, notebooks, tablets, telephones, and so forth.

In one aspect, the biometric data of the voter includes at least one of:
a fingerprint of the voter;
a palm pattern of the voter;
an iris pattern of the voter;
a photograph of the voter's face; and
a voice recording of the voter.

For an illustrative example, after a voter arrives at the polling station and before the voting commences, the voter places his/her finger against a fingerprint scanner on an electronic balloting device. The fingerprint scanner scans the fingerprint, digitizes the image, and sends the digitized image of the fingerprint to the voter authenticator 110. Then, the voter authenticator 110, obtains (receives) the image of the fingerprint from the fingerprint scanner and matches the obtained image of the fingerprint with data in a voter database 111. If a match is found, the voter is authenticated. If no matching data is found in the voter database 111, the authentication is considered as failed and the voter is not allowed to cast the vote until a correction is made.

In another aspect, the electronic identifier of the voter is at least:
voter authentication data, such as a login and password;
an electronic key;
a QR code or barcode with unique voter identifier (UID); and
an electronic digital signature of the voter.

For an illustrative example, when the voter arrives at the polling station, the voter provides a document corroborating the voter's identity (passport, driver's license, etc.). Upon successful presentation of the corroborating document, the voter receives a printed QR code (for example, by a device installed at the polling station and generating onetime QR codes) for activation of a voting device (i.e., for the ability to take part in the elections). In one aspect, the QR code may be a onetime code (i.e., it can only be used once). If, for whatever reason, it was not possible to use the QR code, another QR code may be generated for the voter, but it will not be possible to use several QR codes at the same time (due to the features of the electronic balloting system). Thus, the vote obtained with the use of only one QR code will be counted (such as the vote obtained earlier than others may be counted).

In yet another example, a person may register as a voter in advance at the election commission and receive, in advance, an electronic key (e.g., a device containing an electronic-digital signature of the voter). Then, the voter may subsequently participate in votes being conducted by that election commission, using the previously received electronic key.

In yet another aspect, the voter database 111 contains reference data of the voters corresponding to the data gathered from the voter during authentication of the voter. For example, the voter database 111 may contain biometric reference data of the voter (fingerprints, iris pattern, etc.) previously provided by the voter to the election commission, or obtained by the election commission from government agencies (in the case of government elections). In one aspect, the voter authentication is performed based on this reference data—the biometric data obtained from the voter during the voting is compared with the biometric reference data.

In yet another aspect, the voter database 111 stores information used to make a decision as to whether a particular voter is entitled to participate in the voting, and if so, what voting entitlements are to be afforded to the voter. For example, if the election commission is conducting several different elections at the same time (such as all-Russia municipal elections), the information may indicate, for each voter from the voter database 111, precisely which municipal elections the voter can participate in by voting.

In one aspect, the electronic ballot generator 120 is designed to:
generate, for the indicated voter, an electronic ballot based on previously prepared voting information 121 while taking into account that the authentication so successfully performed; and
provide, to the voter, access to the generated electronic ballot.

In one aspect, the electronic ballot is an electronic document containing voting information including at least one of: a voting topic, a voting date, all possible voting options, an option chosen by the voter (the electronic vote of the voter), a time at which the voter voted, and so forth.

In yet another aspect, the electronic ballot is presented to the voter in a visualized manner, e.g., via a display device. For example, the voter may vote with the use of an electronic balloting device having a sensory display on which the voting information and voting options are displayed. Then, the voter can select the necessary option on the screen and confirm his/her choice.

In yet another aspect, access to the generated electronic ballot is provided to the voter by means of a specialized software or an API, at least:
- locally through special electronic balloting devices;
- by means of an application installed and running on a mobile device of the voter or a stationary computer; and
- by means of a cloud service, access to which being provided with the aid of a browser.

For example, instead of a device for electronic balloting, in one aspect, the voter may use their own mobile telephone. For instance, the voter: may visit an appropriate site or use a previously installed software, familiarize himself/herself with the voting information, possible voting options, etc., after which, select an option out of all the possible voting options presented, confirm the voter's choice, and the like. Then, after the voter's choice is confirmed, the electronic vote of the voter will be generated at the site or in the installed software and will be sent to the appropriate services for further analysis and counting.

In yet another aspect, the voter authenticator 110 and the electronic ballot generator 120 run on the same computing device within a single application.

In one aspect, the vote registrar device 130 is designed to:
- gather data on a choice of the voter on the electronic ballot provided to the voter (hereinafter, the electronic vote of the voter); and
- register the electronic vote of the voter in a database of votes cast 131.

Even though data on the choice of the voter and so forth is gathered by the vote registrar device 130, when generating the electronic vote of the voter, all of the information is anonymized, i.e., it is made impossible to determine a voter and for which candidate they voted, yet it will remain possible to distinguish two electronic votes of voters from each other (i.e., it is not possible to use the same electronic vote of a voter for a second time, or to substitute the electronic vote of one voter for the electronic vote of another voter).

In one aspect, a decentralized registry of records is used to store the registered and counted electronic vote of a voter.

For example, in one aspect, a blockchain technology may be used to store the registered and counted electronic vote of a voter, where each electronic vote of a voter represents a next block in a blockchain being generated.

In yet another aspect, the electronic vote of the voter is anonymized prior to registration. For example, the information about the voter may be removed entirely from the vote of the voter; or a hash may be generated in such a way that the vote of the voter could be identified (i.e., it would be possible to distinguish two electronic votes of a voter from each other), but the voter himself could not be identified (for example, the voter data is used to calculate the MDS, which is used afterwards as a unique voter identifier).

In one aspect, the election monitor 140 is designed to:
- generate a request to be presented to the voter to confirm the validity of the electronic vote of the voter;
- gather from the voter a response to the generated request; and
- send the gathered response to the vote counter 160.

In one aspect, the request to be presented (sent) to the voter comprises at least one of:
- an email to be sent to the voter containing a link to confirm the choice made;
- an SMS message or push notification to be sent to the voter, the SMS message or push notification containing a link or a number which can be used to confirm the choice made; and
- a request to be sent to a specialized voting software installed on the voter's mobile telephone or stationary computer.

In yet another aspect, the request to the voter is generated at least:
- after passage of a predetermined time from the time of registration of the electronic vote of the voter; and
- upon a number of registered votes of the voters exceeding a predetermined threshold value.

In one example, after the voter has voted in the elections, the voter receives an email one hour later, the email containing a link the voter can follow to confirm or revoke the vote of the voter. If revoked, the vote cast by the voter will not be counted in the final tally. For example, if the email is received by a user who did not participate in the elections, the confirmation fails and the vote cast is revoked.

In another example, push notifications are sent out to the voters after every 100,000 votes are cast.

In one aspect, the remote vote registrar device 150 is designed to:
- generate a hard copy of the ballot filled out by the voter in the centralized ballot repository 151; and
- send information about the result of the generation of the hard copy to the vote counter 160.

In one aspect, the hard copy of the ballot filled out by the voter comprises a printed list of voting choices with an indication of the option that is chosen.

In yet another aspect, the remote vote registrar device 150 is a combination of a container for storage of papers (which may be a safe protected against cracking) and a printer, where the printer performs the printing of the filled-out ballot, and the container is a protected repository of the printed ballot. For instance, the remote vote registrar device 150 may be a device that includes a combination of a printer (a printing device) and a sealed ballot box.

For an illustrative example, the voter may vote outside their city, but after casting an electronic vote, the remote vote registrar device 150 installed at the polling station where the voter is registered may print out the ballot with the vote cast by the voter. Thus, a kind of two-factor authorization of the voter's vote occurs. That is, after the voting is finished, it is possible to check the correctness of the votes cast, correct the voting results, or declare the voting invalid.

In one aspect, the vote counter 160 is designed to count the voter's vote in a database of counted votes 161 when positive feedback is obtained from the voter and a confirmation is received from the remote vote registrar device 150.

Figure 2:
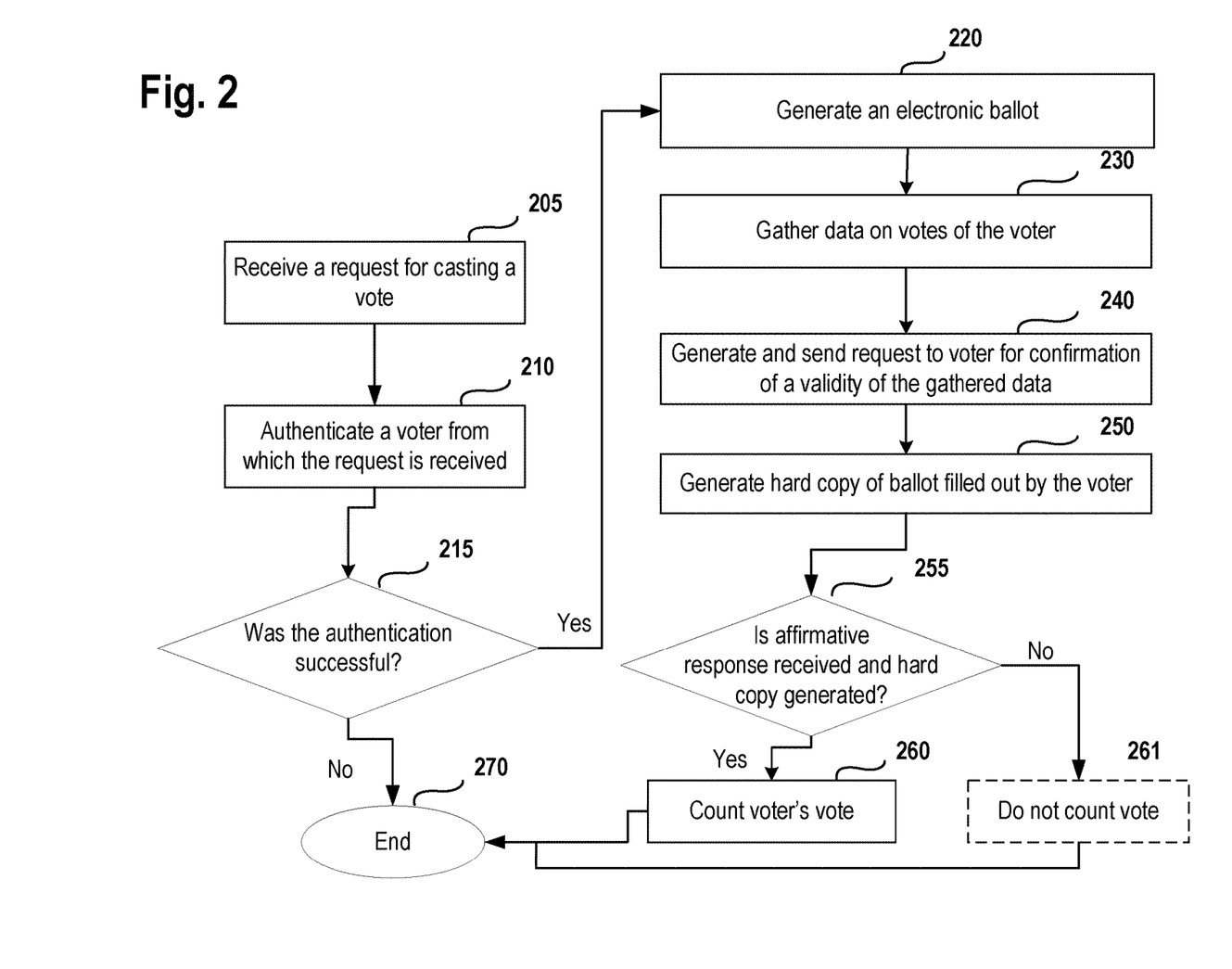
FIG. 2 illustrates an exemplary method for casting a vote in an electronic balloting system in accordance with aspects of the present disclosure.

FIG. 2 illustrates an exemplary method 200 for casting a vote in an electronic balloting system in accordance with aspects of the present disclosure.

In step 205, method 200 receives a request for casting a vote in an electronic balloting system.

In step 210, method 200 authenticates a voter from whom the request for casting the vote is received. In other words, the voter who intends to vote is authenticated.

In step 215, method 200 determines whether the authentication was successful. When the voter is successfully authenticated, the method proceeds to step 220. Otherwise, the method returns to step 270.

In one aspect, the authentication of the voter is performed based on at least one of: biometric data of the voter, and an electronic digital signature of the voter. The electronic digital signature of the voter is unique to the individual.

In step 220, method 200 generates an electronic ballot based on voting information in accordance with the authentication of the voter. In one aspect, the voting information is previously prepared, i.e., prior to the session for casting of the vote.

In step 230, method 200 gathers data about electronic votes of the voter (voter's choices), wherein the electronic vote represents a choice of the voter on the electronic ballot. In other words, for the given voter, the electronic votes are gathered from among a number of choices presented to the voter. In one aspect, different votes may be combined such that the voter votes on multiple elections at the same time. For example, a first vote may be cast from among candidates for a first office, a second vote may be cast from among candidates for a second office, a third vote may be cast for a ballot issue (e.g., a budget approval or rejection, a new law being passed or being rejected), and so on.

In step 240, method 200 generates and sends at least one request to the voter, the request being generated for confirmation of a validity of the gathered data on the electronic vote of the voter.

In one aspect, the sending of the request to the voter for the confirmation of the validity of the gathered data about the electronic vote of the voter is performed upon at least one of:
  an expiration of a predetermined time interval from a time of registration of the electronic vote of the voter; and
  a number of votes by registered voters is exceeded by a predetermined threshold value.

When a particular voter is voting for multiple elections that are running at the same time, in one aspect, a specific request is generated for each election. In another aspect, the request is generated for all elections, in which case, confirmation implies that the data is accurate for all the votes that the voter cast for the multiple elections that are being conducted simultaneously.

In step 250, method 200 generates a hardcopy of the ballot filled out by the voter and places the generated hardcopy in a centralized repository.

In one aspect, the hardcopy of the ballot filled out by the voter includes: a printed listing of items among which the voter is to select by casting a vote and an indication of the selected item.

In step 255, method 200 determines whether or not an affirmative response is received from the voter in response to the at least one request sent to the voter for confirmation, and whether or not the hardcopy of the ballot filled out by the voter is successfully generated. When the affirmative response is received and the hardcopy is successfully generated (i.e., both conditions are met), method 200 proceeds to step 260. Otherwise, method 200 proceeds to step 261.

In general, once the user has submitted his/her vote, a number of steps are taken to determine whether or not to exclude the vote from the vote count. In one example, the vote may be due to forgery or may be submitted multiple times. In another example, the voter may be casting a vote for another candidate even though the vote does not involve casting multiple choices of candidates, e.g., first choice, second choice, etc. In yet another example, someone may cast a vote with inaccurate parameters for the vote. For instance, a vote may be cast for a fourth candidate, when there are only three choices presented to the voter. This may happen if an ID is assigned to each candidate and the voter casts his/her vote to an ID that is not assigned to any of the legitimate candidates. Thus, a number of steps are taken to make sure the vote is valid before it is added to the system.

In step 260, method 200 counts the vote of the voter and proceeds to step 270.

In optional step 261, method 200 skips counting the vote of the particular voter and proceeds to step 270. In one aspect, in step 261, method 200 may provide information regarding the uncounted vote to an election monitor (e.g., election monitor 140).

In step 270, method 200 ends the process for casting of the vote for the voter and returns to step 205.

In one aspect, method 200 further comprises: storing the counted votes of the voter in a decentralized registry of records (i.e., a decentralized database of records).

In one aspect, method 200 further comprises: storing the cast (i.e., registered) votes of the voter in a decentralized registry of records (i.e., a decentralized database of records).

In one aspect, the authentication of the voter is performed based on at least one of: biometric data of the voter, and an electronic digital signature of the voter, wherein the electronic digital signature of the voter is unique to the voter.

In one aspect, the sending of the request to the voter for the confirmation of the validity of the gathered data about the electronic vote of the voter is performed upon an expiration of a predetermined time interval from a time of registration of the electronic vote of the voter.

In one aspect, the sending of the request to the voter for the confirmation of the validity of the gathered data about the electronic vote of the voter is performed when a number of votes by registered voters is exceeded by a predetermined threshold value.

In one aspect, the hardcopy of the ballot filled out by the voter includes: a printed listing of items among which the voter is to select by casting a vote and an indication of the selected item.

In one aspect, the method further comprises: skipping the counting of the vote of the voter when the generation of the hardcopy of the ballot is unsuccessful or an affirmative response is not received from the voter in response to the at least one request sent for confirmation of the validity of the gathered data; and providing information regarding the uncounted vote to an election monitor.

In one aspect, the method further comprises at least one of: storing the counted votes of the voter in a decentralized registry of records; and storing the cast votes of the voter in a decentralized registry of records.

Figure 3:
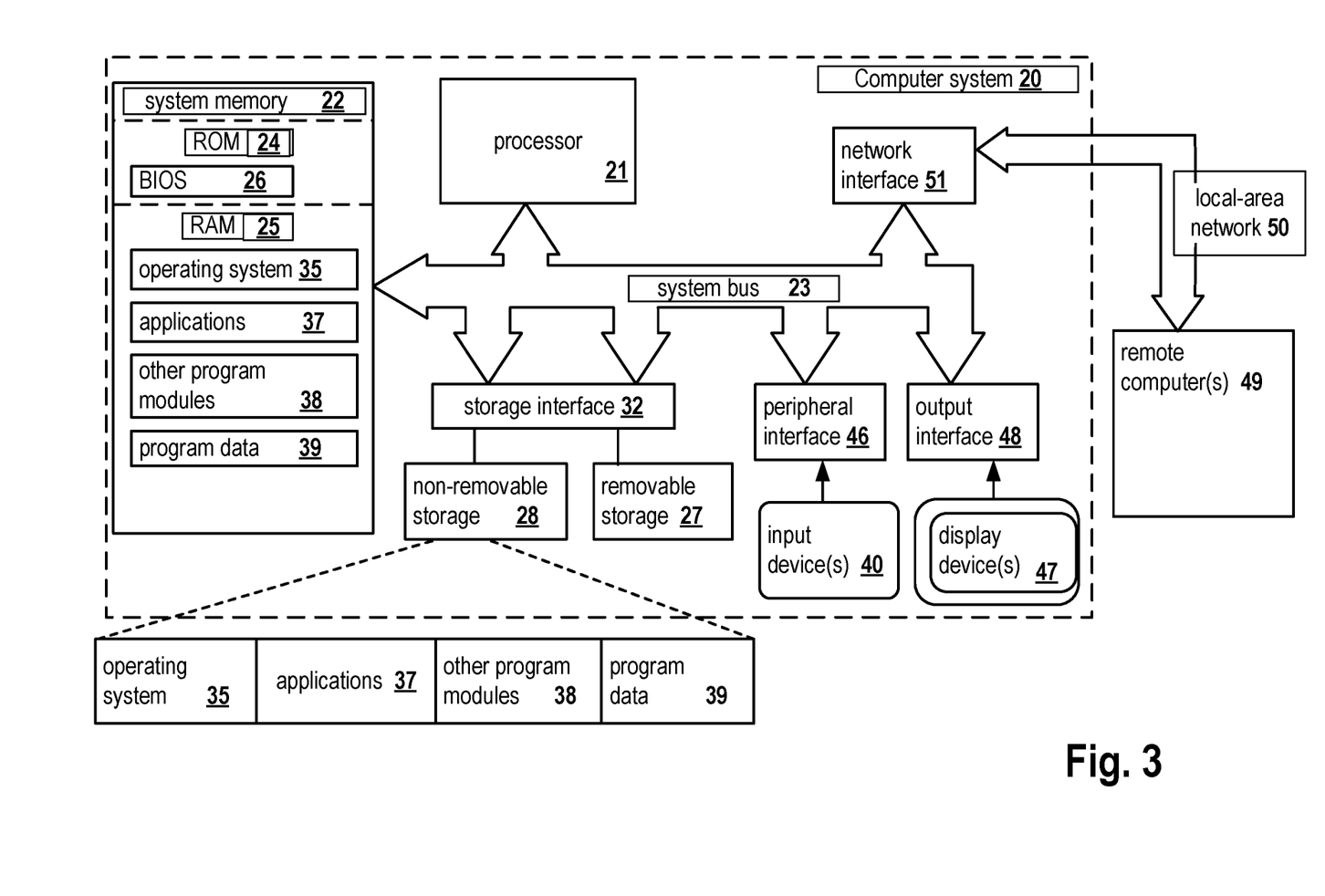
FIG. 3 presents an example of a general purpose computer system on which aspects of the present disclosure can be implemented.

FIG. 3 is a block diagram illustrating a computer system 20 on which aspects of systems and methods for casting a vote in an electronic balloting system may be implemented in accordance with exemplary aspects. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA)

may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 3, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for casting a vote in an electronic balloting system including a computing device, the method comprising:
authenticating a voter from whom a request for casting a vote is received;
when the voter is successfully authenticated, generating an electronic ballot based on voting information;
gathering data about an electronic vote of the voter, the electronic vote representing a choice of the voter on the electronic ballot;
generating and sending at least one request to the voter, the request being generated for confirmation of a validity of the gathered data on the electronic vote of the voter, wherein the sending of the request to the voter for the confirmation of the validity of the gathered data about the electronic vote of the voter is performed when a number of votes by registered voters is exceeded by a predetermined threshold value and upon an expiration of a predetermined time interval from a time of registration of the electronic vote of the voter;
generating a hardcopy of the ballot filled out by the voter and placing the generated hardcopy in a centralized repository; and
counting the vote of the voter, when the hardcopy of the ballot is successfully generated and an affirmative response is received from the voter in response to the at least one request sent for confirmation of the validity of the gathered data.

2. The method of claim 1, wherein the authentication of the voter is performed based on at least one of: biometric data of the voter, and an electronic digital signature of the voter, wherein the electronic digital signature of the voter is unique to the voter.

3. The method of claim 1, wherein the hardcopy of the ballot filled out by the voter includes: a printed listing of items among which the voter is to select by casting a vote and an indication of the selected item.

4. The method of claim 1, further comprising:
skipping the counting of the vote of the voter when the generation of the hardcopy of the ballot is unsuccessful or an affirmative response is not received from the voter in response to the at least one request sent for confirmation of the validity of the gathered data; and
providing information regarding the uncounted vote to an election monitor.

5. The method of claim 1, further comprising at least one of:
storing the counted votes of the voter in a decentralized registry of records; and
storing the cast votes of the voter in a decentralized registry of records.

6. A system for casting a vote in an electronic balloting system, comprising:
at least one processor of a computing device configured to:
authenticate a voter from whom a request for casting a vote is received;
when the voter is successfully authenticated, generate an electronic ballot based on voting information;
gather data about an electronic vote of the voter, the electronic vote representing a choice of the voter on the electronic ballot;
generate and send at least one request to the voter, the request being generated for confirmation of a validity of the gathered data on the electronic vote of the voter, wherein the sending of the request to the voter for the confirmation of the validity of the gathered data about the electronic vote of the voter is performed when a number of votes by registered voters is exceeded by a predetermined threshold value and upon an expiration of a predetermined time interval from a time of registration of the electronic vote of the voter;
generate a hardcopy of the ballot filled out by the voter and place the generated hardcopy in a centralized repository; and
count the vote of the voter, when the hardcopy of the ballot is successfully generated and an affirmative response is received from the voter in response to the at least one request sent for confirmation of the validity of the gathered data.

7. The system of claim 6, wherein the authentication of the voter is performed based on at least one of: biometric data of the voter, and an electronic digital signature of the voter, wherein the electronic digital signature of the voter is unique to the voter.

8. The system of claim 6, wherein the hardcopy of the ballot filled out by the voter includes: a printed listing of items among which the voter is to select by casting a vote and an indication of the selected item.

9. The system of claim 6, the processor further configured to:
skip the counting of the vote of the voter when the generation of the hardcopy of the ballot is unsuccessful or an affirmative response is not received from the voter in response to the at least one request sent for confirmation of the validity of the gathered data; and
provide information regarding the uncounted vote to an election monitor.

10. The system of claim 6, the processor further configured to perform at least one of:
storing the counted votes of the voter in a decentralized registry of records; and
storing the cast votes of the voter in a decentralized registry of records.

11. A non-transitory computer readable medium storing thereon computer executable instructions for casting a vote in an electronic balloting system, including instructions for executing on a computer comprising a processor:
authenticating a voter from whom a request for casting a vote is received;
when the voter is successfully authenticated, generating an electronic ballot based on voting information;
gathering data about an electronic vote of the voter, the electronic vote representing a choice of the voter on the electronic ballot;
generating and sending at least one request to the voter, the request being generated for confirmation of a validity of the gathered data on the electronic vote of the voter, wherein the sending of the request to the voter for the confirmation of the validity of the gathered data about the electronic vote of the voter is performed when a number of votes by registered voters is exceeded by a predetermined threshold value and upon an expiration of a predetermined time interval from a time of registration of the electronic vote of the voter;
generating a hardcopy of the ballot filled out by the voter and placing the generated hardcopy in a centralized repository; and
counting the vote of the voter, when the hardcopy of the ballot is successfully generated and an affirmative response is received from the voter in response to the at least one request sent for confirmation of the validity of the gathered data.

12. The non-transitory computer readable medium of claim 11, wherein the authentication of the voter is performed based on at least one of: biometric data of the voter, and an electronic digital signature of the voter, wherein the electronic digital signature of the voter is unique to the voter.

13. The non-transitory computer readable medium of claim 11, wherein the hardcopy of the ballot filled out by the voter includes: a printed listing of items among which the voter is to select by casting a vote and an indication of the selected item.

14. The non-transitory computer readable medium of claim 11, the instructions further comprising instructions for:
skipping the counting of the vote of the voter when the generation of the hardcopy of the ballot is unsuccessful or an affirmative response is not received from the voter in response to the at least one request sent for confirmation of the validity of the gathered data; and
providing information regarding the uncounted vote to an election monitor.

15. The non-transitory computer readable medium of claim 11, the instructions further comprising instruction for at least one of:
storing the counted votes of the voter in a decentralized registry of records; and
storing the cast votes of the voter in a decentralized registry of records.

* * * * *